United States Patent [19]

Butcher, Jr.

[11] Patent Number: 5,308,690
[45] Date of Patent: May 3, 1994

[54] WRAPPING FILM

[76] Inventor: Duane S. Butcher, Jr., 150 Pine View Dr., Gillette, Wyo. 82716

[21] Appl. No.: 941,725

[22] Filed: Sep. 8, 1992

[51] Int. Cl.$^5$ ............................................. B32B 7/00
[52] U.S. Cl. ................................. 428/256; 156/306.6; 156/308.2; 156/324; 428/105; 428/110; 428/138; 428/140; 428/296; 428/192
[58] Field of Search ............... 428/109, 110, 247, 256, 428/138, 139, 140, 296, 105, 285, 457, 192; 156/308.2, 306.6, 324

[56] References Cited

U.S. PATENT DOCUMENTS

| | | | |
|---|---|---|---|
| 3,214,320 | 10/1965 | Lappala et al. | 428/140 |
| 3,222,237 | 12/1965 | McKelvey | 156/177 |
| 3,297,461 | 1/1967 | Siddall | 428/256 |
| 3,310,453 | 3/1967 | Lappala et al. | 428/256 |
| 3,616,130 | 10/1971 | Rogosch et al. | 161/57 |
| 3,644,165 | 2/1972 | Chen | 161/58 |
| 4,096,304 | 6/1978 | Greengrass | 428/138 |
| 4,170,675 | 10/1979 | Greengrass | 428/109 |
| 4,188,248 | 2/1980 | Millgardh et al. | 156/306.6 |
| 4,389,438 | 6/1983 | Ohtsuki et al. | 156/306.6 |
| 4,666,751 | 5/1987 | Pasquale et al. | 428/247 |
| 4,698,247 | 10/1987 | Murray et al. | 428/35 |
| 4,735,669 | 4/1988 | Guida et al. | 156/306.6 |
| 4,948,651 | 8/1990 | DeBusk et al. | 428/247 |
| 4,983,449 | 1/1991 | Nee | 428/247 |
| 5,093,194 | 3/1992 | Touhsaent et al. | 428/349 |

*Primary Examiner*—James J. Bell
*Attorney, Agent, or Firm*—Don J. Flickinger; Jordan M. Meschkow; Lowell W. Gresham

[57] ABSTRACT

An upper plastic film and a lower plastic film sandwiching a formable stiffening layer fused together to form a stiffened conformable wrapping film.

11 Claims, 2 Drawing Sheets

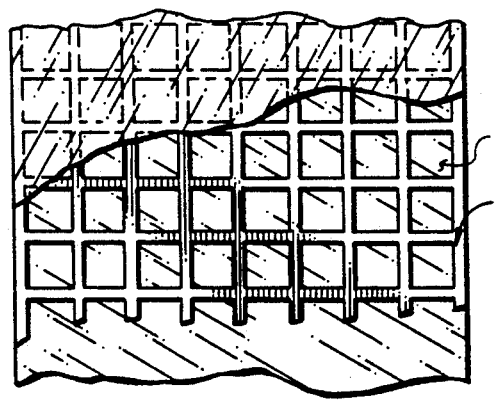
FIG. 4
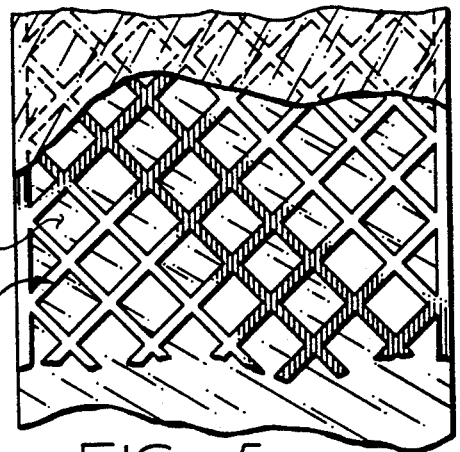
FIG. 5
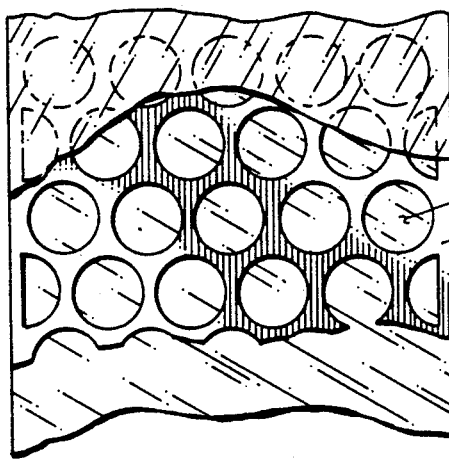
FIG. 6
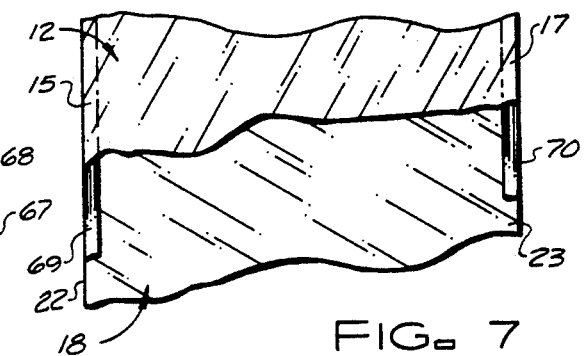
FIG. 7
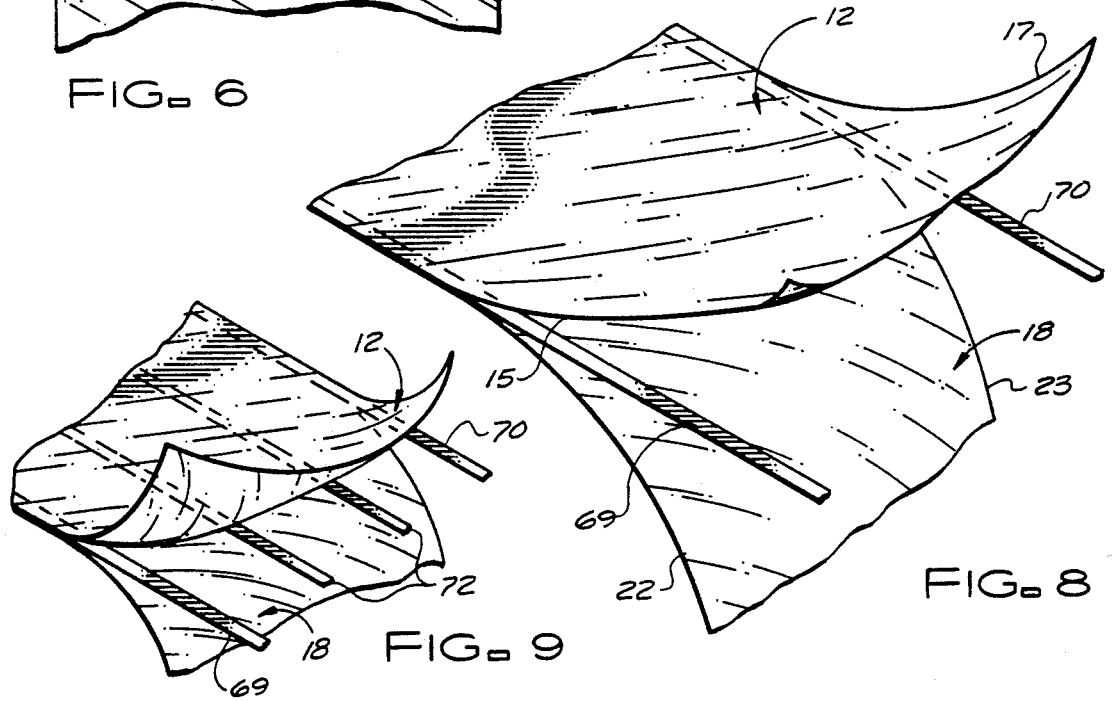
FIG. 8
FIG. 9

WRAPPING FILM

BACKGROUND OF THE INVENTION

1. Field of the Invention

This invention relates to materials for storing items.

More particularly, the present invention relates to wrapping films of the types used to wrap items and cover containers.

2. Prior Art

Devices for covering or wrapping items for storage have long been sought after. These devices are especially important for storing food items. Storing food items generally requires wrapping or covering containers to seal in moisture and keep the contents fresh. Specialized containers with air tight lids, constructed of plastic or like materials are well-known. Many people when storing food articles such as those left over from a meal, prefer to store the food articles in the cooking, or the serving container, and not transfer them to a specialized storage container. Many of these containers such as platters, bowls or pots have greatly varied shapes, requiring a cover or covering device which can cover a wide variety of containers.

To overcome the problems of containers having unique dimensions, loss of lids and covers or a containers having no cover, a wrapping film made of very thin plastic was developed. This plastic wrap has the desirable properties of being extremely flexible, thereby being usable on substantially any shape, or being used alone to wrap a food article. This wrapping material clings to the sides of containers made of many different materials, and will also cling to itself, allowing a very tight, if not an air tight, fit. This wrapping film is also transparent, which is very desirable for use in storing items such as food left over from a meal. The transparency of the wrapping film allows a person to see what is wrapped or what a container holds at a glance.

The greatest problem with this material is its tendency to become entangled with itself while being used. Generally stored in a roll which is unrolled as desired, a length of wrapping material is unwound and sheared on a metal edge. The flexibility of the plastic film along with its stretchability will many times result in the material rebounding when it has been sheared from the roll. This rebounding or snapping back of the plastic film results in entangling of the material. These tangles, wherein the wrapping material clings to itself, are very difficult to remove. Once a piece of wrapping material is successfully removed, it must be handled very carefully to prevent any portion from contacting any other portion or entanglement will occur. Unfortunately, since the material is so thin and flexible this is a very difficult undertaking.

An alternative to using a plastic film is the use of a metal foil. While this does not cling to itself or the container, it conforms to the shape of a container or item being wrap. The benefit of foil, is its relative simplicity of use. It is not as thin and flexible as plastic film, therefore it does not deform to the same extent as the plastic film when such deformation is not desired. While foil is stiff enough to maintain a shape for easier handling, it will also conform to substantially any shape when a slight pressures is applied. The stiffness of the metal foil taken together with the absence of cling, provides an easily handled wrapping material which does not become entangled. However, foil will not form an air tight seal when used to cover a container unless the entire container is enclosed. Another problem with metal foil is that it is opaque. A package wrapped in foil must be labeled or opened in order to determine what it contains. This requires a great deal more effort than a quick glance.

Each of these wrapping materials can also be used to wrap individual loose items, such as sandwiches etc. Each adequately protects the article, but have the problems mentioned above. Specifically, the difficulty associated with using the plastic wrap, and the opacity which prevents viewing of articles wrapped in metal foil.

Furthermore, many metal foils cannot be used in a microwave oven but are extremely useful in a conventional oven, while conversely many plastic wraps cannot be used in a conventional oven.

It would be highly advantageous, therefore, to remedy the foregoing and other deficiencies inherent in the prior art.

Accordingly, it is an object of the present invention to provide a new an improved wrapping film.

Another object of the present invention is to provide a wrapping film which is quick and easy to use.

And another object of the present invention is to provide a wrapping film which may be stored in a traditional dispensing container.

Still another object of the present invention is to provide a wrapping film which is self-clinging and will cling to a variety of containers.

Yet another object of the present invention is to provide a wrapping film which will not become entangled with itself.

Yet still another object of the present invention is to provide a wrapping film which is flexible and will conform to substantially any shape.

A further object of the instant invention is to provide a substantially transparent wrapping film to allow viewing of wrapped items.

And a further object of the present invention is to provide a wrapping film which will lie flat, thereby sealing items extremely well, especially along edges of containers.

Yet a further object of the present invention is to provide a microwave safe wrapping film.

And yet a further object of the present invention is to provide an oven safe wrapping film.

SUMMARY OF THE INVENTION

Briefly, to achieve the desired object of the instant invention in accordance with a preferred embodiment thereof, provided is a first plastic film and a second plastic film sandwiching a formable stiffening layer. The first plastic film and second plastic film are fused to form a single uniform material with the formable stiffening layer embedded therein.

In accordance with a method of fabricating the improved wrapping film, a formable stiffening member is fed between a first plastic film and a second plastic film. The first plastic film and the second plastic film are fused together with the formable stiffening layer embedded therebetween.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 4 is a cut away top view of the wrapping film, illustrating a configuration of a formable stiffening member;

FIG. 5 is a cut away top view of the wrapping film illustrating an alternate configuration of the formable stiffening layer;

FIG. 6 is a cut away top view of the wrapping film illustrating a further configuration of the formable stiffening layer;

FIG. 7 is a cut away top view of the wrapping film illustrating yet a further configuration of the formable stiffening layer;

FIG. 8 is a perspective view illustrating the layers of the wrapping film illustrated in FIG. 7; and FIG. 9 is a perspective view illustrating the layers of an alternate configuration of wrapping film.

DETAILED DESCRIPTION OF THE PREFERRED EMBODIMENT

Figure 2:
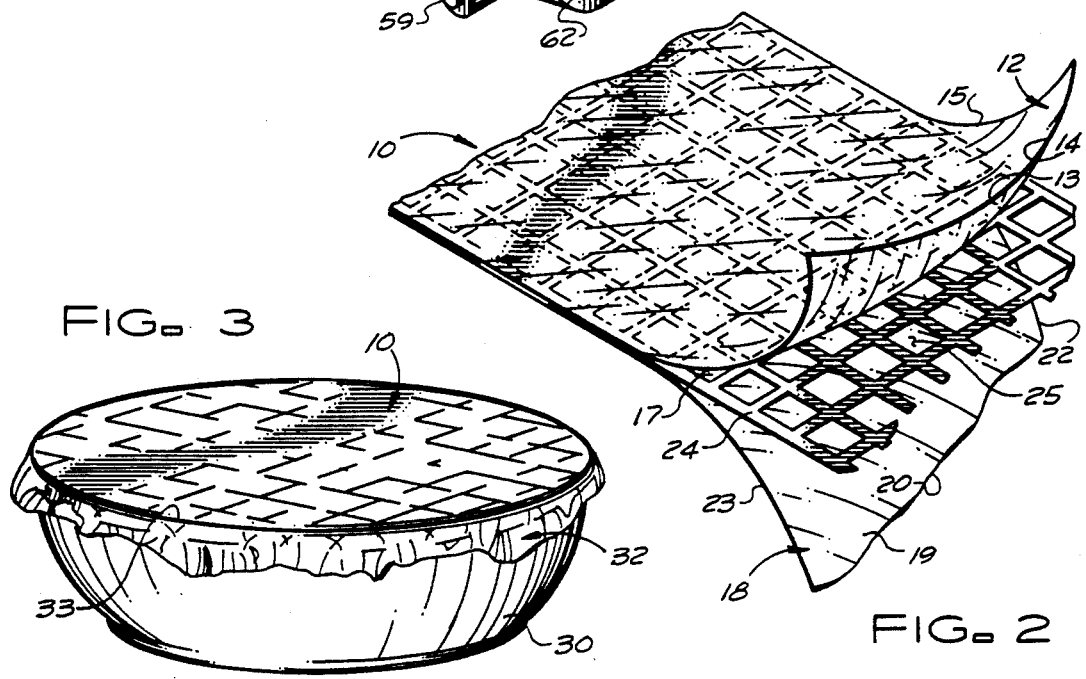
FIG. 2 is a perspective view illustrating the separate layers of the improved wrapping film.

Turning now to the drawings in which like reference characters indicate corresponding elements throughout the several views, attention is first directed to FIG. 2 which illustrates an improved wrapping film generally designated 10. Improved wrapping film 10 is formed from an upper plastic film 12 having an inner surface 13, an outer surface 14, a first side edge 15 and a second side edge 17, and a lower plastic film 18 having an inner surface 19, an outer surface 20, first side edge 22 and second side edge 23. Upper plastic film 12 is bonded to lower plastic film 18, with a formable stiffening layer 24 captured between. Upper plastic film 12 and lower plastic film 18 are preferably conventional plastic wrap material which display self-clinging characteristics. Oven safe high temperature plastic film may also be used to increase the possible uses of wrapping film 10. Formable stiffening layer 24 is preferably a foil mesh having view openings 25. Formable stiffening layer 24 is preferably formed from a metal foil which is characteristically flat and of a formable nature. Since microwave ovens are very popular, use of a microwave safe foil would further increase the uses of wrapping film 10.

Figure 3:
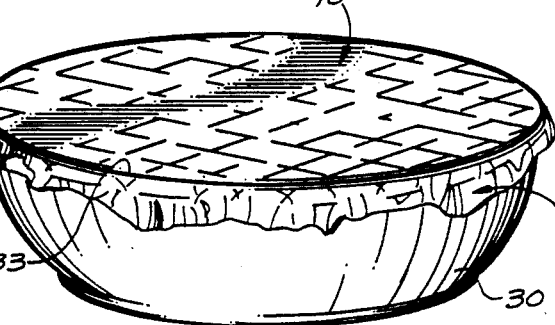
FIG. 3 is a perspective view illustrating a piece of wrapping film covering a container.

Referring now to FIG. 3, improved wrapping film 10 is illustrated covering a bowl 30. Upper plastic film 12 and lower plastic film 18, preferably a transparent plastic, cling to the sides of bowl 30 forming a substantially air tight closure. Since upper and lower plastic films 12 and 18 are transparent, the contents of bowl 30 may be determined at a glance. The addition of formable stiffening layer 24 between upper plastic film 12 and lower plastic film 18 provides a degree of stiffening which increases the ease of using improved wrapping film 10. Formable stiffening layer 24 retains improved wrapping film 10 in a substantially planar sheet until deformation is desired. As can be seen in FIG. 3, the sides of a sheet 32 of wrapping film 10 are folded over edges 33 of bowl 30. Formable stiffening layer 24 conforms to the shape of bowl 30, while plastic films 12 and 18 cling to the sides of bowl 30. View openings 25 in formable stiffening layer 24 allow viewing through wrapping film 10.

Figure 1:
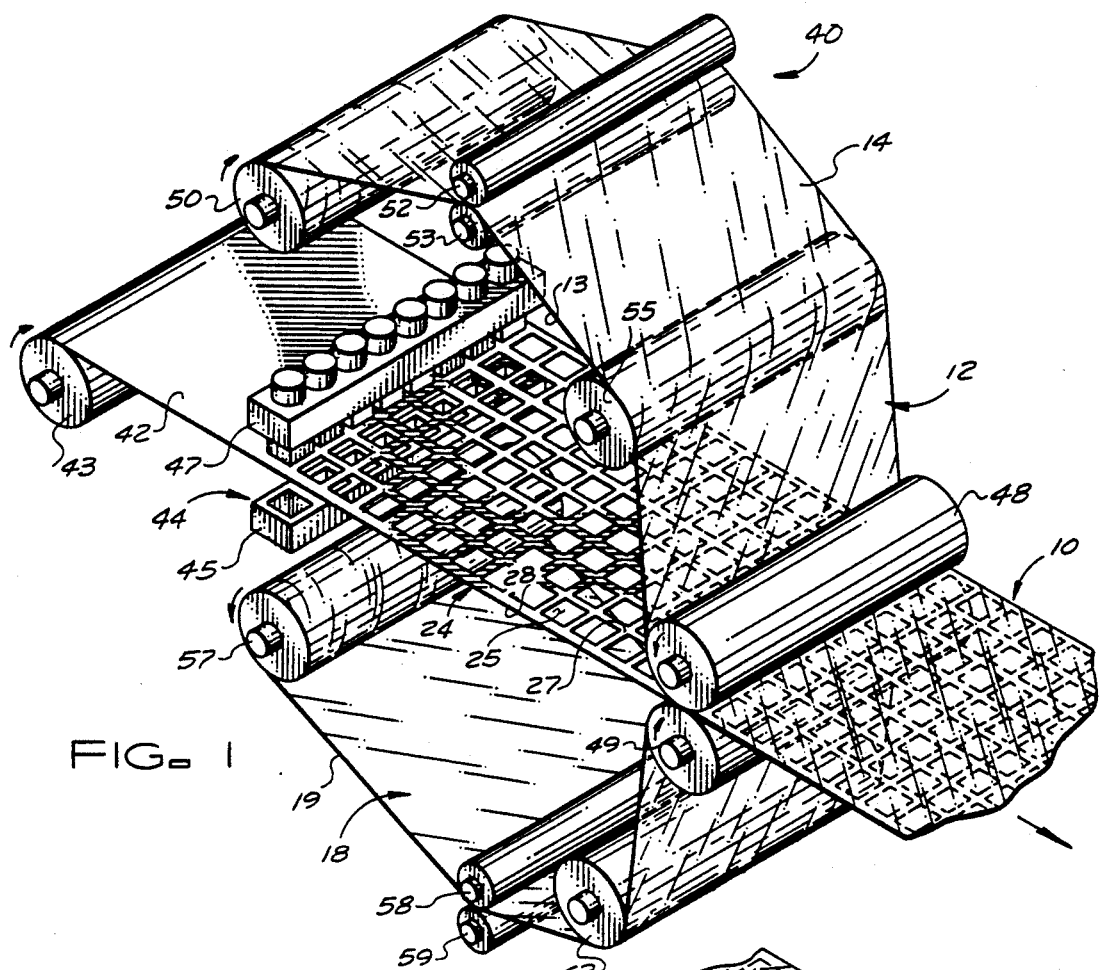
FIG. 1 is a schematic perspective view of an apparatus that may be utilized in forming the improved wrapping film.

Referring now to FIG. 1, wrapping film 10 of the present invention may be made using a laminating apparatus 40. A sheet of metal foil 42 is withdrawn from a supply roll 43. Metal foil 42 is fed through a die set 44 consisting of a die 45 and a punch 47. In this preferred embodiment, die set 44 punches parallel rolls of substantially square view openings 25. However, those skilled in the art will understand that various other view opening configurations may be formed. Various alternate configurations will be discussed in greater detail below. Formable stiffening layer 24 is produced by die set 44 which is operated by conventional means (not shown). Formable stiffening layer 24 which in this embodiment is a foil mesh, is fed between the nip of two laminating rollers 48 and 49. One or both of laminating rollers 48 and 49 are supplied with heat in the form of electrical heaters, steam or any other suitable source of heat (not shown). Upper plastic film 12 is fed into the nip of laminating roller 48 and 49 with its inner surface 13 facing and contacting top surface 27 of formable stiffening layer 24. Upper plastic film 12 is conveniently supplied to laminating rollers 48 and 49 by storage roll 50. To overcome the slight clinging of inner surface 13 of upper plastic film 12, a separate drive assembly may be used to draw upper plastic film 12 from storage roll 50. In the apparatus depicted, an upper supply roll 52 and a lower supply roll 53 are utilized to draw upper plastic film 12 from storage roll 50 and supply it to the nip of laminating rollers 48 and 49. Upper supply roller 52 may be conveniently powered by an electrical motor or other suitable drive unit (not shown). Lower supply roller 53 can be optionally driven if desired. After leaving the nip of the pair of supply rollers 52 and 53, upper plastic film 12 may optionally be passed over an upper pre-heat roller 55.

Lower plastic film 18 is drawn from a lower storage roll 57 by means of a set of lower supply rollers 58 and 59. A second drive unit (not shown) similar to the first drive unit is provided to actuate lower supply rollers 58 and 59. A lower pre-heat roller 62 may also be utilized to pre-heat lower plastic film 18. Lower plastic film 18 is fed into the nip of laminating rollers 48 and 49 with its inner surface 19 facing and contacting bottom surface 28 of formable stiffening layer 24. As upper plastic film 12 and lower plastic film 18 are fed through the nip of laminating rollers 48 and 49 inner surface 13 of upper plastic film 12 and inner surface 19 of lower plastic film 18 cane into contact, and fuse together through view openings 25 of formable stiffening layer 24.

Those skilled in the art will understand that a wide range of temperatures and pressures may be employed with laminating rollers 48 and 49 to fuse upper plastic film 12 to lower plastic film 18. Generally, as pressure between laminating rollers 48 and 49 increases, temperature may be decreased. The method of this invention may employ relatively high pressures, since formable stiffening layer 24 is formed from a flat metal foil 42. Since formable stiffening layer 24 is a flat layer between upper plastic film 12 and lower plastic film 18 there are no protuberances which could be forced through or damage upper plastic film 12 or lower plastic film 18.

FIGS. 4–7 illustrate alternate configurations for the formable stiffening layer. FIG. 4 illustrates the preferred configuration generally designated 24, having parallel rows of generally square view openings 25. FIG. 5 illustrates a formable stiffening layer, generally designated 64, configured with rows of generally square view openings 65 rotated substantially 45°. FIG. 6 illustrates a formable stiffening layer generally designated 67, configured with substantially round view openings 68 stamped in metal foil 42 in staggered rows. Each of these configurations is a layer embedded in wrapping film 10 which provides stiffening to the wrapping film while allowing viewing therethrough.

FIG. 7 illustrates a formable stiffening layer consisting of a first foil strip 69 extending between upper plastic film 12 and lower plastic film 18 along first side edges 15 and 22 of each respectively. A second foil strip 70 is placed between upper plastic film 12 and lower plastic film 18 extending along second side edges 17 and 23 of each respectively. The formable stiffening layer using foil strips 69 and 70 provides stiffening for wrapping film 10 while providing an unobstructed view therethrough. Furthermore, foil strips 69 and 70 may act as twist ties for further enhancing the sealability of wrapping film 10.

FIG. 9 illustrates additional foil strips 72 embedded between upper plastic film 12 and lower plastic film 18 parallel to and intermediate first foil strip 69 and the second foil strip 70. Additional foil strips increase the stiffness of wrapping film 10.

The use of a formable stiffening layer between layers of plastic film, prevent the tangling inherent in the use of plastic wrapping films, without obstructing the view therethrough. Therefore the sealability, high flexibility, and transparency of plastic wrapping film is maintained while the stiffness and conformability of foil wrapping material is combined therewith to eliviate the negative characteristics of each. Since formable stiffening layer 24 is flat, wrapping film 10 will lay relatively flat. Therefore there is substantially no unevenness caused by the foil, and therefore, no unnecessary air leakage.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A wrapping film comprising:
    a first transparent plastic film layer;
    a second transparent plastic film layer fused to said first plastic film layer; and
    a flattened formable stiffening layer captured between said first and second transparent plastic film layers.

2. A wrapping film as claimed in claim 1 wherein said formable stiffening layer is a metal foil having a plurality of viewing openings forming therein.

3. A wrapping film as claimed in claim 1 wherein said formable stiffening layer is a first and second metal foil strip extending along side edges of said first and second plastic film layers.

4. A wrapping film as claimed in claim 3 wherein said formable stiffening layer further includes additional metal foil strips extending parallel to and intermediate said first and second metal foil strips.

5. A wrapping film as claimed in claim 1 wherein said first and second film layers are oven safe, high temperature plastic.

6. A method of fabricating a wrapping film comprising the steps of:
    providing a flattened formable stiffening layer;
    sandwiching said formable stiffening layer between a first transparent plastic film and a second transparent plastic film; and
    fusing said first plastic film to said second plastic film with said flattened formable stiffening layer therebetween.

7. A method as claimed in claim 6 wherein the step of providing a formable stiffening layer includes the steps of:
    providing a metal foil; and
    cutting viewing openings in said metal foil.

8. A method as claimed in claim 6 the step of providing a formable stiffening layer includes providing metal foil strips.

9. A method as claimed in claim 8 wherein the step of sandwiching includes placing a first and second metal foil strip along each side edge, between said first plastic film and said second plastic film.

10. A method as claimed in claim 9 wherein the step of sandwiching further includes placing additional metal foil strips parallel to and intermediate said first and second metal foil strips.

11. A method as claimed in claim 6 wherein the step of fusing includes:
    passing said first plastic film through heated rollers;
    passing said second plastic film through heated rollers;
    pressing said first heated plastic film to said second heated plastic film.

* * * * *

UNITED STATES PATENT AND TRADEMARK OFFICE
CERTIFICATE OF CORRECTION

PATENT NO. : 5,308,690
DATED : May 3, 1994
INVENTOR(S) : Duane S. Butcher, Jr.

It is certified that error appears in the above-identified patent and that said Letters Patent is hereby corrected as shown below:

Column 6, Line 32 (Claim 8) insert --wherein-- after "6"

Signed and Sealed this

Thirtieth Day of August, 1994

Attest:

BRUCE LEHMAN

*Attesting Officer*         *Commissioner of Patents and Trademarks*